(12) United States Patent
Bains et al.

(10) Patent No.: US 7,673,257 B1
(45) Date of Patent: Mar. 2, 2010

(54) SYSTEM, METHOD AND COMPUTER PROGRAM PRODUCT FOR WORD-LEVEL OPERATOR-TO-CELL MAPPING

(75) Inventors: Shail Bains, Noida (IN); Abhishek Ranjan, Noida (IN); Anmol Mathur, San Jose, CA (US); Venky Ramachandran, Cupertino, CA (US)

(73) Assignee: Calypto Design Systems, Inc., Santa Clara, CA (US)

( * ) Notice: Subject to any disclaimer, the term of this patent is extended or adjusted under 35 U.S.C. 154(b) by 47 days.

(21) Appl. No.: 11/682,243

(22) Filed: Mar. 5, 2007

(51) Int. Cl.
*G06F 17/50* (2006.01)
(52) U.S. Cl. .............................. 716/1; 716/18
(58) Field of Classification Search ............ 716/1, 716/6, 7, 18
See application file for complete search history.

(56) References Cited

U.S. PATENT DOCUMENTS

| | | | | |
|---|---|---|---|---|
| 5,317,755 | A * | 5/1994 | Hartley et al. ................ | 712/19 |
| 6,223,197 | B1 * | 4/2001 | Kosugi ....................... | 708/620 |
| 6,298,472 | B1 * | 10/2001 | Phillips et al. ................ | 716/18 |
| 6,571,268 | B1 * | 5/2003 | Giacalone et al. ............ | 708/524 |
| 6,772,398 | B2 * | 8/2004 | Saluja et al. ................. | 716/2 |
| 6,836,877 | B1 * | 12/2004 | Dupenloup .................. | 716/18 |
| 7,269,617 | B1 * | 9/2007 | Esposito et al. ............. | 708/625 |
| 2001/0056455 | A1 * | 12/2001 | Lin ............................. | 708/700 |
| 2002/0002573 | A1 * | 1/2002 | Landers et al. ............. | 708/501 |
| 2002/0178285 | A1 * | 11/2002 | Donaldson et al. .......... | 709/237 |
| 2006/0053396 | A1 * | 3/2006 | Eng ............................. | 716/7 |
| 2006/0206850 | A1 * | 9/2006 | McCubbrey ................. | 716/17 |

OTHER PUBLICATIONS

Israel, Koren, "Computer Arithmetic Algorithms, $2^{nd}$ Edition." Natick, MA. 2002.
U.S. Application No. 11/335,928, filed on Jan. 20, 2006.
U.S. Application No. 11/601,272, filed on Nov. 16, 2006.
"Dynamic Programming Solution to the Coin Changing Problem" *CSG713 Advanced Algorithms*, Sep. 27, 2004 www.ccs.neu.edu/home/jaa/CSG713.04F/Information/Handouts/dyn_prog.pdf.
Sanjeev Saluja, Anmol Mathur, "Improved Merging of Datapath Operators using Information Content and Required Precision Analysis"dac, pp. 462-467 $38^{th}$ Conference on Design Automation (DAC'01), 2001.
Synopsys Liberty Format http://www.synopsys.com/partners/tapin/lib_info.html.
Koreb, Israel, "Computer Arithmetic Algorithms, $2^{nd}$ Edition."

* cited by examiner

*Primary Examiner*—Jack Chiang
*Assistant Examiner*—Suchin Parihar
(74) *Attorney, Agent, or Firm*—Zilka-Kotab, PC

(57) ABSTRACT

A mapping system, method and computer program product are provided. In use, at least one arithmetic operator is received. Further, the at least one arithmetic operator is mapped to at least one cell, at a word-level.

26 Claims, 7 Drawing Sheets

SYSTEM, METHOD AND COMPUTER PROGRAM PRODUCT FOR WORD-LEVEL OPERATOR-TO-CELL MAPPING

BACKGROUND AND FIELD OF THE INVENTION

The present invention relates to design optimization, and more particularly, to performing operator-to-cell mapping.

SUMMARY

A mapping system, method and computer program product are provided. In use, at least one arithmetic operator is received. Further, the at least one arithmetic operator is mapped to at least one cell, at a word-level.

DETAILED DESCRIPTION

Figure 1:
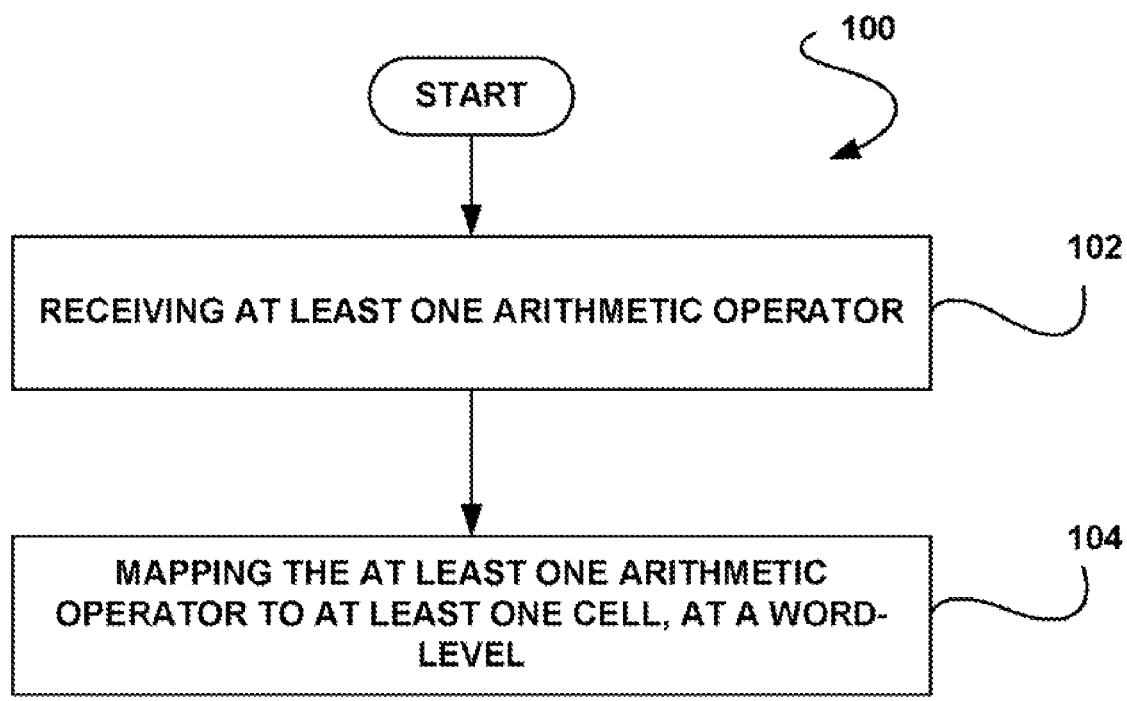
FIG. 1 illustrates a method for word-level operator-to-cell mapping, in accordance with one embodiment.

FIG. 1 illustrates a method 100 for word-level operator-to-cell mapping, in accordance with one embodiment. As shown, at least one arithmetic operator is received. Note operation 102. In the context of the present description, the arithmetic operator includes any operator capable of performing arithmetic. In one embodiment, the arithmetic operator may perform arithmetic on data (e.g. operands, etc.) associated with the arithmetic operator. In various other exemplary embodiments, the arithmetic operator may include, but is not limited to an adder, a multiplier, a divider, a sum of product expression, a shifter, a subtracter a mux, etc.

Further, the arithmetic operator is mapped to at least one cell, at a word-level, as shown in operation 104. In the context of the present description, such cell may refer to any design-related aspect that is associated with a system capable of utilizing the data operator(s). Thus, the cell may be capable of performing the arithmetic operation (e.g. carrying out logic associated with the arithmetic operation, etc.). In one optional embodiment, a single arithmetic operator may be mapped to a plurality of cells.

In another exemplary embodiment, the cell may include an architectural cell. Further, such architectural cell may be included in a library. The library may, in one possible embodiment, also include abstract data operators, logic cells, pre-characterized blocks as macros, etc. Further, the library may provide predefined mappings of arithmetic operators to cells.

In an illustrative embodiment, the mapping may include associating the arithmetic operator with the cell, at the word-level. Just by way of example, the mapping may, in one embodiment, include technology mapping. Still yet, in the context of the present description, the aforementioned technology mapping may refer to any mapping of a first design (e.g. arithmetic operator) to a second design (e.g. cell).

Thus, as an option, a first library may be associated with the first design. In one possible embodiment, the first design may be represented by a first netlist (e.g. a generic/technology-independent netlist, an arithmetic operator netlist, etc.), while the second design may be represented by a second netlist (e.g. a technology-dependent netlist, a word-level netlist, etc.). Optionally, the second netlist may not necessarily be utilized by particular downstream implementation engines (e.g. placement, routing, etc.). For example, such engines may utilize a bit-level netlist.

In use, the technology mapping may be utilized for ensuring that timing constraints are met. Such timing constraints may include, for example, user-defined timing constraints. Additionally, the timing constraints may be associated with a timed duration in which it takes the arithmetic operator to execute.

Moreover, in one optional embodiment, a netlist of the second design may achieve a minimal combination of area and power, if the timing constraints can be met. Further, the netlist of the second design may achieve a minimal worst timing violation, if such timing constraints cannot be met. In this way, the second design may be utilized to minimize any given measure (e.g. objective function, etc.), with respect to a given set of fixed or point constraints, and may further be computationally efficient in a situation where the first design is large.

In another exemplary embodiment, the mapping may include datapath synthesis. Datapath synthesis may, in one embodiment, include the mapping of the arithmetic operator to a specific technology library. Optionally, the datapath synthesis may be automatically performed in response to receipt of the arithmetic operator.

Still yet, in the context of the present description, the word-level may include, for example, any level that is above bit-level. In one exemplary embodiment, the word-level may utilize a collection of bits of a predetermined size or number, and/or any other set or group of bits that are ordered. In another embodiment, the word-level may include a plurality of words that each correspond to a collection of bits, etc.

Accordingly, in one embodiment, the arithmetic operator may be mapped to the cell utilizing a collection of bits of a predetermined size, etc. In this way, mapping at a bit-level may be avoided, such that runtime and memory capacity utilized by the arithmetic operator during execution thereof may be reduced. Further, capacity may optionally be increased in an implementation flow of the arithmetic operator by utilizing such word-level mapping.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the other features described.

Figure 2:
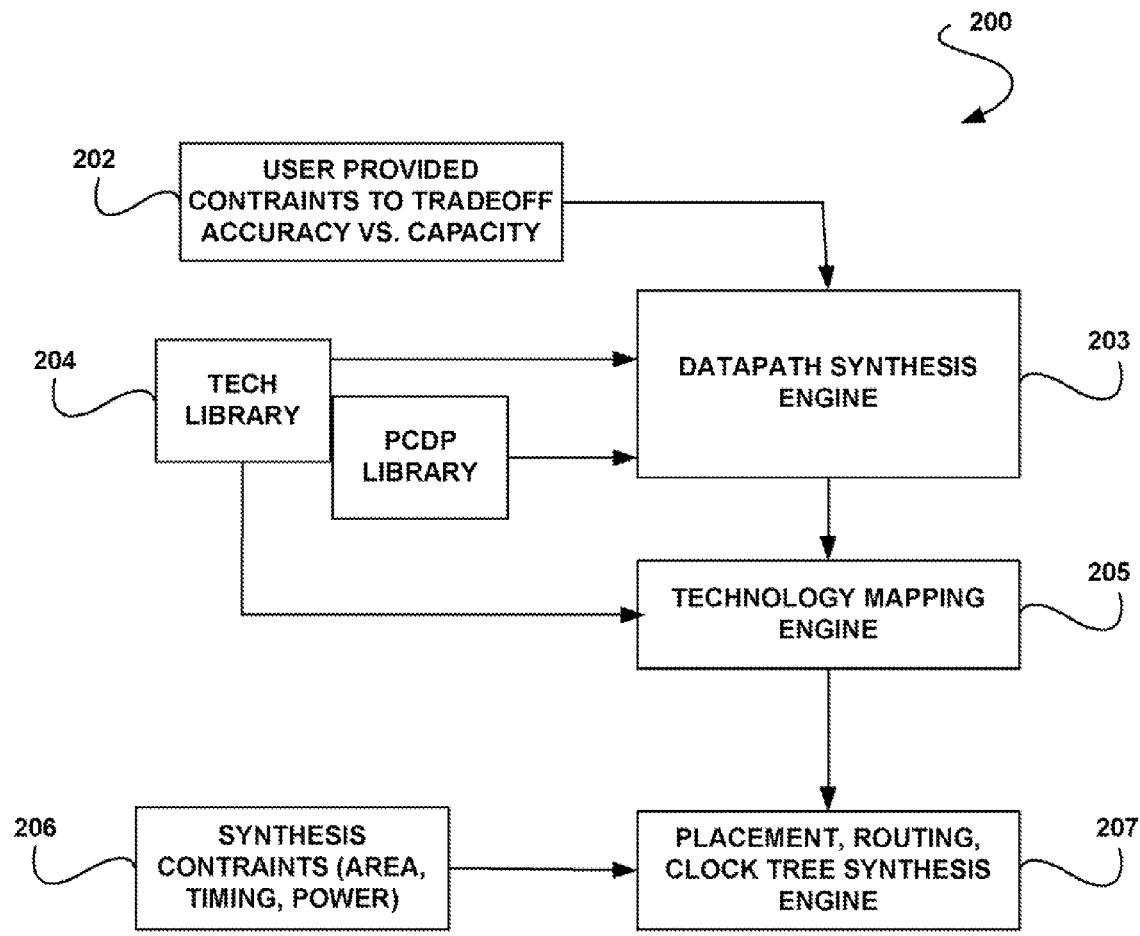
FIG. 2 illustrates a system for word-level operator-to-cell mapping, in accordance with another embodiment.

FIG. 2 illustrates a system 200 for word-level operator-to-cell mapping, in accordance with another embodiment. As an option, the system 200 may be employed in the context of the method 100 of FIG. 1. Of course, however, the system 200 may be implemented in any desired environment. Further, the foregoing definitions may apply during the course of the present description.

As shown, user-provided constraints 202 associated with a tradeoff between accuracy and capacity are provided to a datapath synthesis engine 203. For example, the user-provided constraints 202 may specify an amount of capacity and/or accuracy desired with respect to the implementation of word-level operator-to-cell mapping (e.g. the performance of the arithmetic operator, etc.). Thus, in various embodiments, the user-provided constraints 202 may include timing constraints, memory constraints, etc. Of course, however, the user-provided constraints 202 may be associated with any desired limitations placed on the word-level operator-to-cell mapping.

In addition, the datapath synthesis engine 203 provides implementations for arithmetic operators to a technology mapping engine 205. Such implementations may be provided at a word-level In addition, the implementations may identify cells associated with circuits capable of executing the arithmetic operator. In one embodiment, the technology mapping engine 205 may call the datapath synthesis engine 203 to provide such implementations.

Further, the datapath synthesis engine 203 may provide such implementations based on at least one library 204. Such library 204 may include, for example, a precharacterized datapath (PCDP) library. In one embodiment, the PCDP library may be specific to a technology library, as shown.

The PCDP library 204 may include a collection of PCDP cells. Each PCDP cell may represent an arithmetic operator with particular width and/or signedness combinations associated with inputs such cell may receive. In addition, each PCDP cell may be associated with a particular architecture of the arithmetic operator. Furthermore, each PCPD cell may be associated with timing constraints defined during characterization of the arithmetic operator utilizing register transfer level (RTL) synthesis. Optionally, the PCDP cell may include a Liberty library format (.lib).

In one exemplary embodiment, a PCDP cell may be generated for a full carry look-ahead (FCLA) adder that includes signed word inputs. The PCDP cell may be generated by creating a synthesizable RTL cell that represents the adder and architecture associated therewith. In addition, a synthesis script may also be created which associates timing constraints with such inputs and also with output of the adder. The synthesis script may then be executed utilizing an RTL synthesis tool for producing a word-level implementation of the adder.

Further, a PCDP generator may make timing and area queries on the word-level implementation to generate timing arcs for the PCDP cell Further, information associated with the word-level implementation may be reported in any desired format. For example, the timing arcs may be reported in the Liberty library format. Additionally, the resulting cell may be associated with other information, such as for example, cell function and area.

Thus, the library 204 may process generated PCDP cells and therefore provide a predefined mapping between a plurality of different arithmetic operators and a plurality of different PCDP (e.g. logic) cells. It should be noted that the datapath synthesis engine 203 and the technology mapping engine 205, while shown separately, may also be integrated in a single engine. As described below, the technology mapping engine 205 may process and/or utilize the PCDP cells.

In one embodiment, the technology mapping engine 205 identifies covers for the implementations. In one embodiment, covers may be identified for each node included in a circuit associated with an implementation. Optionally, the technology mapping engine 205 may identify the covers utilizing dynamic programming.

In this way, the technology mapping engine 205 may be utilized for mapping arithmetic operators to logic cells for carrying out logic of such arithmetic operators. In one embodiment, performance of the technology mapping engine 205 may be based on a number of nodes (e.g. logic cells, etc.) utilized in executing a particular arithmetic operator. For example, the time required to execute an arithmetic operator may be a function of the number of nodes utilized in such execution.

However, utilizing word-level implementations, the number of nodes associated with an implementation may be reduced. Accordingly, the memory capacity of the technology mapping engine 205 may be increased while also decreasing runtime required to execute an arithmetic operator associated with such implementation. Still yet, decreasing the number of nodes may result in less accuracy in the implementation of the arithmetic operator.

Thus, the user-provided constraints 202 may be utilized for determining limits on the accuracy and/or capacity associated with the implementation of the arithmetic operator. For example, error, as compared to the accuracy of a bit-level implementation, may be kept within predefined bounds. Moreover, a placement, routing and clock tree synthesis engine 207 may be utilized for ensuring area, timing, power, architecture, etc. constraints 206, therefore ensuring a specified amount of accuracy with respect to such constraints during the mapping of the arithmetic operator to cells at the word-level. In this way, static timing analysis, power analysis, etc. may also be performed at the word-level, such that any requirement of bit-level mapping may not be necessarily required.

Figure 3:
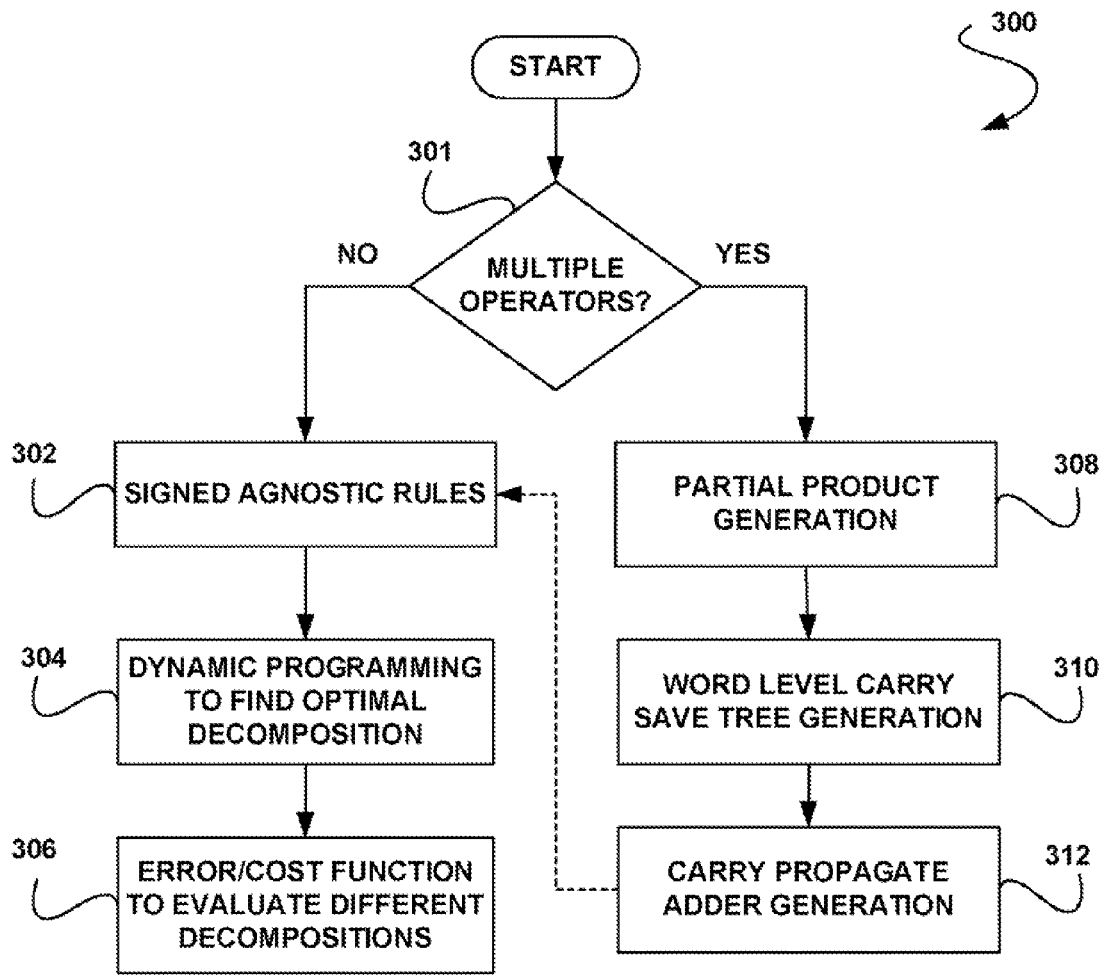
FIG. 3 illustrates a method for word-level operator-to-cell mapping for a single operator and for multiple operators, in accordance with yet another embodiment.

FIG. 3 illustrates a method 300 for word-level operator-to-cell mapping for a single operator and for multiple operators, in accordance with yet another embodiment. As an option, the method 300 may be employed in the context of the architecture and environment of. FIGS. 1 and/or 2. Of course, however, the method 300 may be carried out in any desired environment. Further, the foregoing definitions may apply during the course of the present description.

As shown in decision 301, it is determined whether multiple arithmetic operators are to be mapped to cells at a word-level. For mapping( a single arithmetic operator to cells at a word-level, signed agnostic rules are applied to the single arithmetic operator. Note operation 302. The signed agnostic rules may be utilized for determining whether the arithmetic operator can be mapped to a single cell. In particular, such signed agnostic rules may determine whether the widths and signedness of input and/or output associated the arithmetic operator are suitably matched to the widths and signedness of input and/or output of a particular cell.

For example, the number of cells in a library utilized for mapping arithmetic operators to cells may be limited, whereas the number of arithmetic operators with varying widths and signedness may be greater in number. Thus, a one-to-one mapping between arithmetic operators and cells may be restricted. Accordingly, the signed agnostic rules may be utilized for determining whether the arithmetic operator may be mapped to, and therefore implemented, utilizing a single cell in a library of cells.

In one embodiment, the agnostic rules may characterize the arithmetic operator as $<k_1, x_1> op <k_2,x_2> = <k_3,x_3>$, and may further characterize a cell as $<k_1',x_2'> op <k_2',x_2'> = <k_3',x_3'>$, where xi=signed or unsigned. Table 1 illustrates conditions under which an arithmetic operator may be mapped to a particular cell. It should be noted that such conditions are set forth just by way of example only, and therefore should not be construed as limiting in any manner.

TABLE 1

1. $k_1 \leq k_1'$, $k_2 \leq k_2'$, $k_3 \leq k_3'$
   and mapping of the arithmetic operator is maintained within the limits of the arithmetic operator inputs.
2. If input of width $k_1$ is extended by the mapping, then either
   $x_1 == x_1'$, or $x_1 =$ unsigned and $x_1' =$ signed
   and $k_1 < k_1'$. In addition, the input may be coverted to signed input by adding a most significant bit including a zero bit to each of the inputs.
3. The output of the cell does not have a sign.

If the arithmetic operator cannot be mapped to a particular cell, dynamic programming is utilized to find an optimal decomposition, as shown in operation 304. Such optimal decomposition may provide a mapping between the arithmetic operator and a plurality of cells. Thus, where a direct mapping between an arithmetic operator and a cell is unavailable, namely where a library of cells is incapable of being utilized for mapping a single arithmetic operator to a single cell, the arithmetic operator may be mapped to a collection of cells capable of providing logic for executing the arithmetic operator. In this way, each cell in a library of cells may optionally be utilized in the mapping of a plurality of different arithmetic operators.

For word-level implementation of the arithmetic operator, at least one decomposition of the arithmetic operator into a plurality of cells is identified. Such decomposition may be performed in any desired manner. In one embodiment, the decomposition may be performed by rippling smaller cells, the combination of which comprise the arithmetic operator.

Just by way of example, a 26 bit adder may be implemented utilizing one 16 bit adder, one 8 bit adder and one 2 bit adder, and a cell may be mapped to each of such adders comprising the 26 bit adder. Further, such cells may be connected in ripple fashion, for example, by connecting a carry out of one of the cells to the carry in of another one of the cells. this way, the 26 bit adder may be implemented utilizing a plurality of cells. Of course, however, the 26 bit adder may also be implemented utilizing various other combinations of smaller cells (e g. three 8 bit adders and one 2 bit adder, etc.), the combination of which comprise the 26 bit adder.

Accordingly, a plurality of decompositions may optionally be identified. From such plurality of decompositions, the optimal decomposition may be identified. In one embodiment, the optimal decomposition may include the decomposition associated with the least amount of cells required for implementing the arithmetic operator. Basing the optimal decomposition on the decomposition associated with the least amount of cells required for implementing the arithmetic operator may produce a "coin-change" issue. However, such coin-change issue may optionally be solved utilizing dynamic programming, in a manner that is well known in the art.

In another embodiment, the optimal decomposition may include the decomposition that is associated with the least amount of error as compared to a fully bit-level implementation of the arithmetic operator. Such error may be based on a difference in timing, area, etc. with respect to the fully bit-level implementation of the arithmetic operator. Just by way of example, the error in mapping a cell with a width greater than a width associated with the arithmetic cell may be a factor in determining the optimal decomposition.

Moreover, the error may be determined in any desired manner. In one embodiment, the error may be determined utilizing dynamic programming. For example, an error/cost function may be utilized for evaluating each of the identified decompositions, as shown in operation 306. In particular, an error may be determined for each mapping associated with a decomposition.

Table 2 illustrates one example of an error function that may be applied to identified decompositions. It should be noted that such error function is set forth for exemplary purposes only, and should not be construed as limiting in any manner.

TABLE 2

ΣABS(width (port on cell)-width(corresponding port on arithmetic operator) for all ports on the cell Based on the error associated with each identified decomposition, the decomposition with the least amount of error may be determined to be the optimal decomposition. Of course, however, the decomposition that most closely matches (and optionally does not exceed) a predefined error threshold may be determined to be the optimal decomposition.

For example, the error (e.g. area error, timing error, etc. of the decomposition with respect to a bit level implementation of the associated arithmetic operator, etc.) associated with each identified decomposition may be compared to the threshold, such that the decomposition that is associated within an error that most closely matches the threshold may be determined to be the optimal decomposition. Further, the mapping associated such identified decomposition (based on the comparison) may be selected as the optimal decomposition. In this way, a word-level implementation may be identified that generates the least amount of error when such implementation is utilized for executing the associated arithmetic operator.

However, if it is determined in decision 301 that multiple arithmetic operators are to be mapped to cells at a word-level, a partial product is generated. Note operation 308. In one embodiment, a plurality of partial products may be generated based on the multiple arithmetic operators. Optionally, the multiple arithmetic operators may be mapped to cells at a word-level if such arithmetic operators are capable of being merged. The multiple arithmetic operators may be utilized, for example, in a sum of product expression. Further, the multiple arithmetic operators may be mapped to cells in a manner similar to a multiplier arithmetic operator.

The partial product may be generated in any desired manner. While the partial product generation of a multiplier is described as an example below, it should be noted that a partial product for any plurality of arithmetic operators may similarly be generated. Of course, in another embodiment, the multiplier may be processed as a single operator as described above with respect to operations 302-306.

In one embodiment, the partial product may be generated utilizing a Booth generator. In another embodiment, the partial product may be generated utilizing a Non-Booth generator. For example, utilizing the Non-Booth generator, the multiplier may be ANDed with the data to which such arithmetic operators are to be applied (e.g. the operands), which in the present embodiment may include the multiplicand. For example, each bit of the multiplier may be replicated to form a word of bits that is of the same length as the multiplicand. In this way, two word partial products (e.g. edges, etc.) may be formed, including a multiplicand and a partial product derived from bits of the original multiplier.

The two partial products may then be ANDed utilizing a word-level AND gate. The word-level AND gate may be associated with two inputs and one output, each of which may be of the same width as the multiplicand. Optionally, the output of the AND gate may require an associated sign to be extended if the multiplier to be mapped at word-level is signed.

By maintaining the AND at word-level, technology mapping of the arithmetic operators may be simplified. For example, if the AND gate was at bit-level, technology mapping would be required to identify covers for each of the 1-bit AND gates. However, by utilizing a word-level AND, the technology mapping may only identify a single cover for the arithmetic operators, which may in turn provide increased capacity of an engine providing the technology mapping and may reduce runtime and an amount of memory required for executing arithmetic operators.

Further, as shown in operation 310, a word-level carry save tree is generated. The word-level carry save tree may include any desired carry save data structure. In one embodiment, the word-level carry save tree may be generated at a word-level. In another embodiment, the depth of a carry save tree with k inputs may be calculated based on $\log_{3/2}(k/2)$. One embodiment of the word-level carry save tree may comprise a plurality of word-level full adders, as will be described in more detail below with respect to FIG. 5.

Moreover, the carry save tree may be constructed in any desired manner. In one embodiment, the carry save tree may be constructed utilizing a word-level carry save tree with zero loss. One example of such word-level carry save tree with zero loss will be described below in more detail with respect to FIGS. 4A-B. In another embodiment, the carry save tree may be constructed utilizing a word-level carry save tree with bounded loss. One example of such word-level carry save tree with bounded loss will be described in more detail with respect to FIG. 6.

Still yet, the carry save tree may include any tree capable of producing two outputs based on input of the partial products. Such outputs may include, for example, a sum output and a carry output. Moreover, the outputs may be if the same dimension as the inputs. In particular, such outputs and inputs may include word-level outputs and inputs. For example, the sum output may include a word sum, while the carry output may include a word carry.

The outputs may additionally be processed utilizing a carry propagate adder, as in operation 312. For example, the carry propagate adder may add the outputs of the carry save tree. In addition, the carry propagate adder may utilize operations 302-306 as described above for identifying all optimal implementation of the arithmetic operators based on such outputs.

In one exemplary embodiment, the partial product generation described in operation 308, the word-level carry save tree generation described in operation 310, and the carry propagate adder described in operation 312 may contribute approximately 20%, 40%, and 40%, respectively, to an area count of a bit mapped multiplier arithmetic operator mapped as multiple arithmetic operators. However, utilizing the word-level for the partial product generation described in operation 308, the word-level carry save tree generation described in operation 310, and the carry propagate adder described in operation 312 may reduce such area count.

Figure 4A:
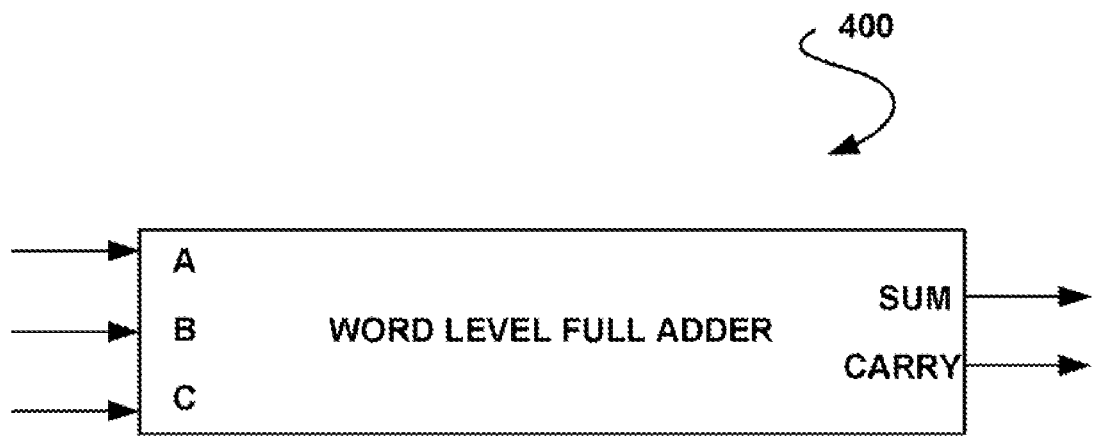
FIGS. 4A-B illustrate partial products processed by a word-level full adder utilized in a word-level carry save tree with zero error, in accordance with another embodiment.
Figure 4B:
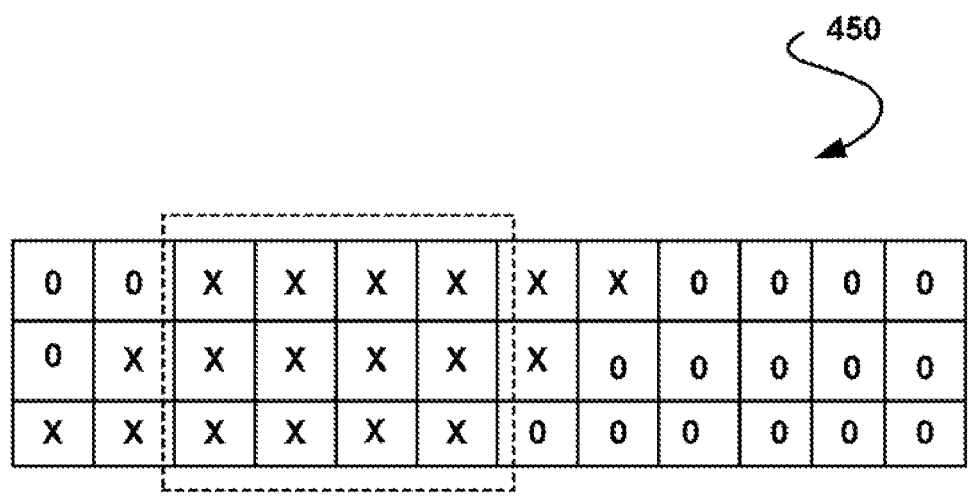

FIGS. 4A-B illustrate partial products 450 processed by a word-level full adder 400 utilized in a word-level carry save tree with zero error, in accordance with another embodiment. As an option, the word-level full adder 400 may be employed in the context of the architecture and environment of FIGS. 1-3. Specifically, the partial products 450 may be processed by a word-level full adder 400 of the carry save tree described in operation 310 of FIG. 3. Of course, however, the partial products 450 may be processed by a word-level full adder 400 in any desired environment. Further, the foregoing definitions may apply during the course of the present description.

As shown in FIG. 4A, three partial products 450 may be processed as inputs utilizing a word-level full adder 400 in order to produce two outputs (e.g. a carry and a sum, etc.). The word-level full adder 400 may include a node capable of accepting three word inputs and producing two word outputs based on such three word inputs. The three word inputs (A, B, C) may each be associated with a width w. In addition, the sum output may also be associated with the width w. Further, the carry output may be associated with a width w+1. Thus, the carry output may be one bit larger than the sum output, where the least significant bit associated there with is zero.

The three partial products may be identified utilizing a priority queue of partial products. In one embodiment, partial products may be stored in the priority queue based on any desired metric. For example, such metric may include partial product generation time, average arrival time, etc.

Thus, three partial products may be removed from the priority queue for generating two partial products utilizing a world level full adder 400. The two generated partial products may then be added to the priority queue. In this way, a balanced partial tree of word-level full adders may be generated.

FIG. 4B illustrates three partial product rows 450 being processed as input to a world level full adder 400. Each column is associated with a bit within the partial products. The zero bits to the right of the highlighted bits include the shift amounts of the partial products. In addition, the 'x' bits represent the core of the partial products. In one embodiment, the 'x' bits may represent non-zero values.

Still yet, the zero bits to the left of the highlighted bits include unsigned extensions of the partial product core. In another embodiment, if the partial product is signed, the most significant bit of the partial product core may be utilized in place of the zero bits located to the left of the highlighted bits. The highlighted portion of the partial products includes the overlapping portions of the partial products.

In addition, the highlighted bits include the bits that are processed by the word-level full adder described above with respect to FIG. 4A. As shown, the bits that are processed by such word-level full adder may only include the bits that are part of the partial product core (e.g. the non-zero and non-one constants). Further, partial products may be processed by row, such that rows associated therewith become smaller after each processing pass until such partial products are of zero width. Any remaining bits may then be combined, as in the case of a bit-level carry save tree. By processing the cores of the partial products, partial products may be processed with a zero loss in accuracy.

Figure 5:
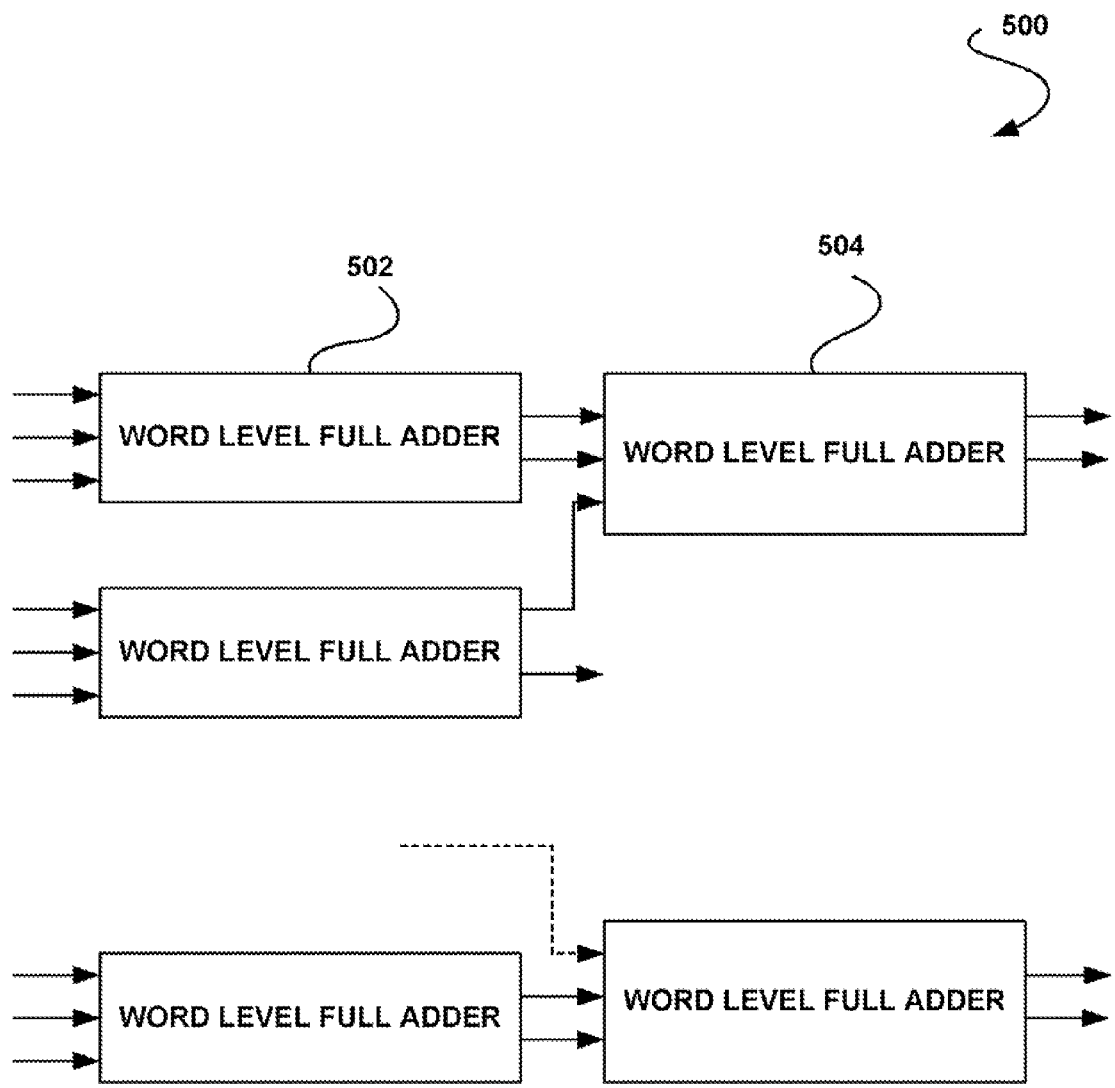
FIG. 5 illustrates a system for implementing a word-level carry save tree, in accordance with still yet another embodiment.

FIG. 5 illustrates a system 500 for implementing a word-level carry save tree, in accordance with still yet another embodiment. As an option, the system 500 may be employed in the context of the architecture and environment of FIGS. 1-4. Specifically, the system 500 may be utilized in operation 310 of FIG. 3. Of course, however, the system 500 may be used in any desired environment. Further, the foregoing definitions may apply during the course of the present description.

As shown, a plurality of partial products may be utilized to construct a word-level carry save tree. In particular, a plurality of word-level full adders may be utilized, as shown. Different levels of the word-level full adders may be utilized. For example, as shown, a first level of word-level full adders 502 may receive as input partial products prior to any processing of such partial products by any other level of world level full adders.

Each word-level full adder may compute a single sum word output and carry word outputs based solely on the corresponding words of the three input partial products. Given the three partial product word inputs, each word-level full adder may produce a partial sum (ps) and a shift-carry (sc) as shown in Table 3. Again, it should be noted that the partial sum word and the shift-carry word shown in Table 3 are set forth just by way of illustration only, and should not be construed as limiting in any manner.

TABLE 3

$ps_i = a_i \oplus b_i \oplus c_i$
$sc_i = (a_i \cdot b_i) + (a_i \cdot c_i) + (b_i \cdot c_i)$ A sum associated with the output of the word-level full adder may then be computed. For example, the carry sequence (sc) may be shifted left by one place. In addition, a zero may be appended to the front (e.g. the most significant bit) of the partial sum sequence (ps). Further, a ripple carry adder may be utilized to add the carry and the sum together for producing the resulting word value.

In one embodiment, using a carry-save adder followed by a ripple carry adder may provide faster results than using two ripple carry adders, since a ripple carry adder may not compute a sum bit without waiting for a previous carry bit to be produced, which may result in a delay equal to that of n full adders. A carry-save adder, however, may produce all of its output values in parallel, and thus may be associated with the same delay as a single full-adder. In this way, the total computation time (in units of full-adder delay time) for a carry-save adder plus a ripple carry adder may be n+1, whereas for two ripple carry adders may be 2n.

A second level of word-level full adders 504 may then receive combined output of the first level of word-level full adders for further processing such partial products. Optionally, the second level of the word-level full adders may process the output of the first level of word-level full adders for similarly generating output. Of course, it should be noted that any number of word-level full adders and/or any number of levels of word-level full adders may be utilized, as desired. Thus, a plurality of word-level full adders may process partial products until such partial products are of zero width.

Figure 6:
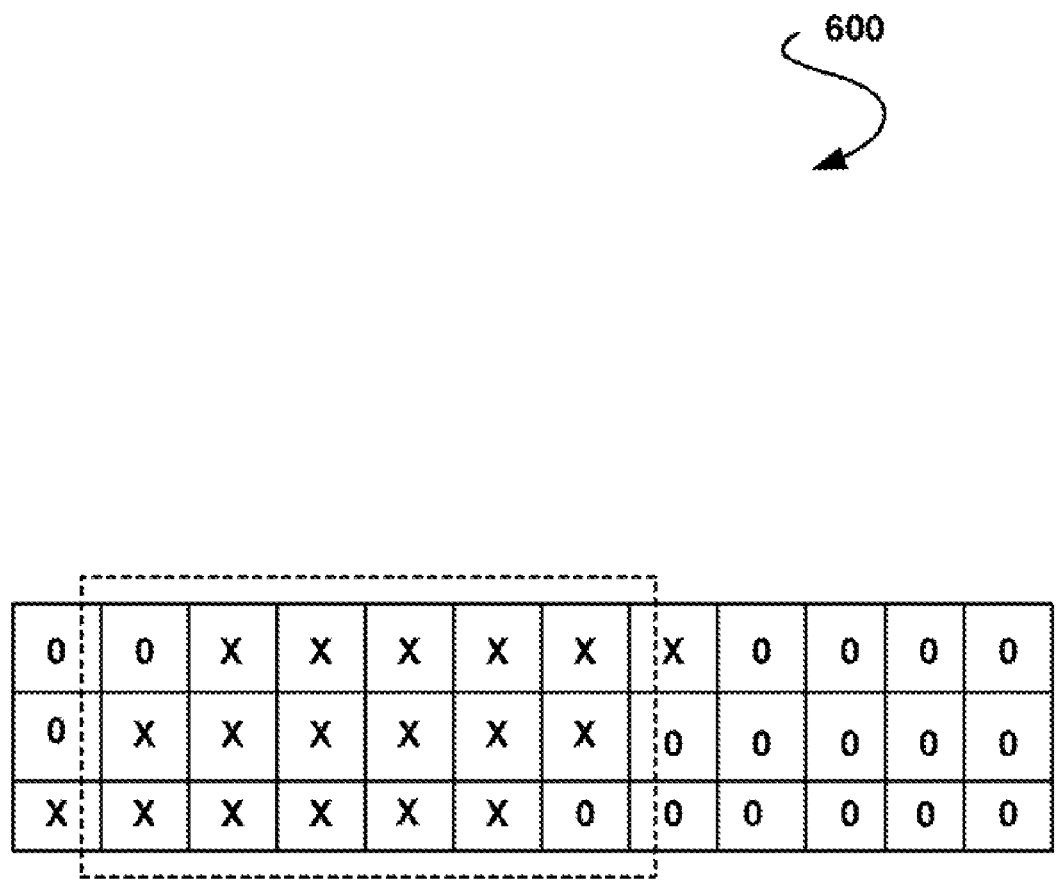
FIG. 6 illustrates partial products capable of being processed by a word-level full adder utilized in a word-level carry save tree with bounded error, in accordance with still yet another embodiment.

FIG. 6 illustrates partial products 600 capable of being processed by a word-level full adder utilized in a word-level carry save tree with bounded error, in accordance with still yet another embodiment. As an option, the partial products 600 may be employed in the context of the architecture and environment of FIGS. 1-5. Specifically, the partial products 600 may be processed in the context of operation 310 of FIG. 3. Of course, however, the partial products 600 may be capable of being processed in any desired environment. Further, the foregoing definitions may apply during the course of the present description.

As shown, the width of the partial products 600 processed by a word-level full adder may allow at least one constant of a partial product 600 to be processed by the word-level full adder. Such constant may include a one or zero value. In this way, a larger number of bits within the partial products 600 may be processed as opposed to the number of bits within the partial products processed in a word-level carry save tree with zero error, as described above with respect to FIGS. 4A-B.

The increased word-level content processed by the word-level full adder, however, may reduce the accuracy of the associated operator-to-cell mapping. In particular, the constant bits values may be required to be processed by the word-level full adder, which is eliminated in the case of a word-level carry save tree with zero error. In this way, the area of the carry save tree may be increased, thus generating a tradeoff between the capacity and accuracy associated with a particular mapping.

As an option, a limit may be placed on the acceptable error resultant from processing such constant bit values. In one embodiment, a tuning factor may be utilized for defining a threshold tor the maximum allowed error. The tuning factor may optionally be user-defined. While the tuning factor is zero, a zero-error word-level carry tree may be provided. However, if the tuning factor is set at a higher value, the error may be allowed to increase. Just by way of example, a tuning factor of 25% may result in an overall area penalty of about 20%.

One example of a tuning factor is described in Table 4. Of course, it should be noted that such tuning factor is set forth for illustrative purposes only, and therefore should not be construed as limiting in any manner.

TABLE 4

1. Let PP1, PP2, PP3 represent the three partial products (i.e. partial product rows)
2. Let $l_0, l_1,$ and $l_2$ where $l_0 \geq l_1 \geq l_2$
   represent column numbers (i.e. bits) associated with
   the partial products, after including for shifts (i.e.
   adding the shift amounts to the widths of the partial product core)
3. Let $r_0, r_1,$ and $r_2$ where $l_0 \geq \leq l_1 \leq l_2$
   be the rightmost columns of the partial products (e.g.
   these may be the same as the shift amounts for the partial
   products)
4. Let $W = l_0 - r_0$ Number of columns with 1 bit value=$(l_0-l_1)+(r_1-r_0)$ Tuning factor is $\alpha$ (where $\alpha=0$, to get a word-level carry save tree with zero error)

If $(l_0-l_1)+(r_1-r_0)<(\alpha*W)$, then
  Commit columns from $l_1$ to $r_1$ (these are columns with 2 or 3 bits) to word-level full adder.
  Commit other columns to bit-level
Else
  Commit all columns from $l_0$ to $r_0$ to bit-level As shown in Table 4, the tuning factor $\alpha$ may be utilized to limit the amount of error tolerated in an implementation of the word-level carry save tree. Since the carry save tree may contribute (e.g. 40%, etc.) to the area of the implementation of a plurality of arithmetic operators (e.g. sum of products, etc.), a bound may be placed on the error associated with the implementation of such arithmetic operators. Accordingly, partial products may be processed with a user-defined level of accuracy.

It should be noted that any of the different embodiments described herein may or may not be supplemented with any one or more of the features set forth in a first co-pending application filed Jan. 20, 2006 under Ser. No. 11/335,928 and entitled "System, Method And Computer Program Product For Word-Level Numerical Computations And Storage," and/or a second co-pending application filed Nov. 16, 2006 under Ser. No. 11/601,272 entitled "System, Method and Computer Program Product for Simultaneous Cell Identification/Technology Mapping" which are each incorporated herein by reference in their entirety for all purposes.

Figure 7:
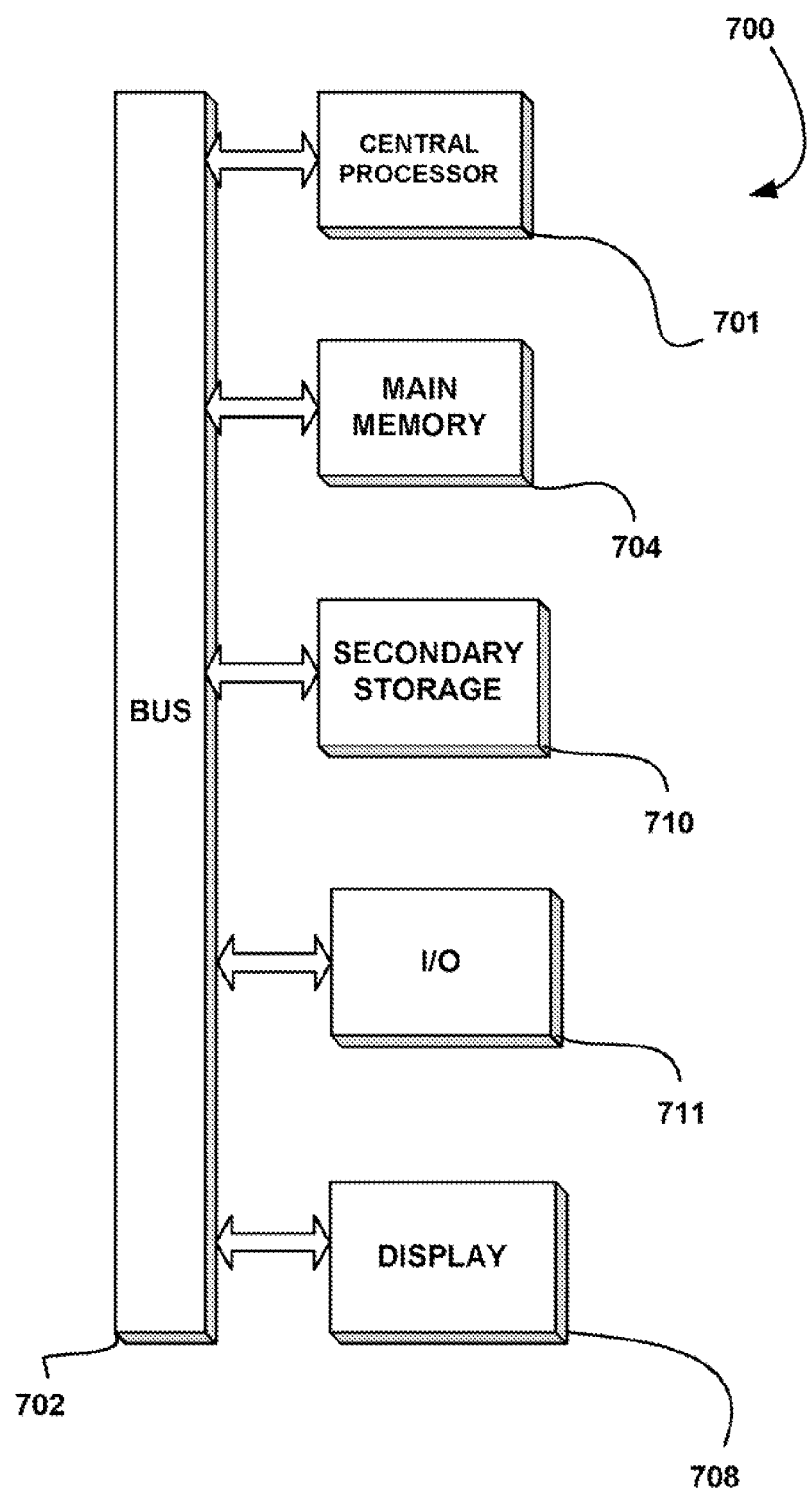
FIG. 7 illustrates an exemplary computer system in which the various architecture and/or functionality of the various previous embodiments may be implemented.

FIG. 7 illustrates an exemplary computer system 700 in which the various architecture and/or functionality of the various previous embodiments may be implemented. As shown, a computer system 700 is provided including at least one host processor 701 which is connected to a communication bus 702. The computer system 700 also includes a main memory 704. Control logic (software) and data are stored in the main memory 704 which may take the form of random access memory (RAM).

The computer system 700 also includes various I/O devices 711 (e.g. keyboard, mouse, camera, microphone, etc.) and a display 708, i.e. a computer monitor. The computer system 700 may also include a secondary storage 710. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the computer system 700 to perform various functions. Memory 704, storage 710 and/or any other storage are possible examples of computer-readable media.

In one embodiment, such computer programs may be used to carry out the functionality of the previous figures. Further, in other embodiments, the architecture and/or functionality of the various previous figures may be implemented in the context of the host processor 701, a chipset (i.e. a group of integrated circuits designed to work and sold as a unit for performing related functions, etc.), and/or any other integrated circuit for that matter.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving at least one arithmetic operator utilizing a processor;
   mapping the at least one arithmetic operator to at least one cell, at a word-level;
   outputting the at least one cell at the word-level; and
   analyzing timing and power utilizing the at least one cell;
   wherein a plurality of the arithmetic operators are received and mapped to the at least one cell, and a plurality of partial products are generated based on the plurality of the arithmetic operators, for decomposing a multiplier into a word-level structure.

2. The method of claim 1, wherein the at least one arithmetic operator is selected from the group consisting of an adder, a multiplier, a divider, a sum of products expression, and a shifter.

3. The method of claim 1, wherein the at least one cell includes an architectural cell.

4. The method of claim 1, wherein the mapping includes technology mapping.

5. The method of claim 1, wherein the mapping includes datapath synthesis.

6. The method of claim 5, wherein the datapath synthesis is automatically performed in response to the receiving the at least one arithmetic operator.

7. The method of claim 1, and further comprising receiving at least one constraint, wherein the mapping is performed based on the at least one constraint.

8. The method of claim 7, wherein the at least one constraint is selected from the group consisting of a timing constraint and an architecture constraint.

9. The method of claim 8, wherein the timing constraint is associated with a timed duration in which it takes the at least one arithmetic operator to execute.

10. The method of claim 1, wherein the mapping is performed utilizing a library.

11. The method of claim 10, wherein the library includes a plurality of mappings between a plurality of different arithmetic operators and a plurality of different cells.

12. The method of claim 11, wherein a single arithmetic operator is mapped to a plurality of cells.

13. The method of claim 12, wherein the single arithmetic operator is mapped to the plurality of cells, if the library is incapable of being utilized for mapping the single arithmetic operator to a single cell.

14. The method of claim 13, wherein the library is incapable of being utilized for mapping the single arithmetic operator to the single cell due to a sign or a width of the single arithmetic operator.

15. The method of claim 1, and further comprising generating a carry save data structure.

16. The method of claim 1, wherein the plurality of the partial products are processed utilizing a plurality of adders.

17. The method of claim 1, wherein the plurality of the partial products are processed at the word-level.

18. The method of claim 1, wherein the plurality of the partial products are processed with a zero loss in accuracy.

19. The method of claim 1, wherein the plurality of the partial products are processed with a user-defined level of accuracy.

20. The method of claim 1, and further comprising comparing an error associated with a plurality of mappings.

21. The method of claim 20, wherein the error associated with the plurality of the mappings is compared to a threshold.

22. The method of claim 20, wherein one of the plurality of the mappings is selected based on the comparison.

23. The method of claim 1, wherein the at least one arithmetic operator is represented by a first netlist and the at least one cell is represented by a second netlist, the second netlist achieving a minimal combination of area and power, if timing constraints can be met and achieving a minimal worst timing violation, if the timing constraints cannot be met.

24. A computer program product embodied on a computer readable medium, which when executed by a computer, performs the following steps comprising:
   identifying at least one arithmetic operator;
   mapping the at least one arithmetic operator to at least one cell, at a word-level;
   outputting the at least one cell at the word-level; and
   analyzing timing and power utilizing the at least one cell;
   wherein the computer program product is operable such that a plurality of the arithmetic operators are received and mapped to the at least one cell, and a plurality of partial products are generated based on the plurality of the arithmetic operators, for decomposing a multiplier into a word-level structure.

25. A system, comprising:
   a processor for mapping at least one arithmetic operator to at least one cell, at a word-level, outputting the at least one cell at the word-level; and analyzing timing and power utilizing the at least one cell;
   wherein the system is operable such that a plurality of the arithmetic operators are received and mapped to the at least one cell, and a plurality of partial products are generated based on the plurality of the arithmetic operators, for decomposing a multiplier into a word-level structure.

26. The system of claim 25, wherein the processor is coupled to memory via a bus.

* * * * *